United States Patent

Nakamura et al.

[11] Patent Number: 5,808,995
[45] Date of Patent: Sep. 15, 1998

[54] DISK INFORMATION READING CONTROL APPARATUS HAVING A VARIABLE READ TRANSFER SPEED AND A DISK INFORMATION READING CONTROL METHOD

[75] Inventors: Nobuyuki Nakamura, Kofu; Yukinori Okazaki, Hirakata; Makoto Usui, Moriguchi, all of Japan

[73] Assignee: Matsushita Electric Industrial Co., Ltd., Osaka, Japan

[21] Appl. No.: 794,268

[22] Filed: Jan. 31, 1997

Related U.S. Application Data

[63] Continuation of Ser. No. 505,619, Jul. 21, 1995, abandoned.

[30] Foreign Application Priority Data

Jul. 22, 1994 [JP] Japan .................................. 6-170720

[51] Int. Cl.⁶ ........................................................ G11B 7/00
[52] U.S. Cl. ............................................. 369/60; 369/50
[58] Field of Search ............................... 369/32, 124, 60, 369/59, 50, 44.28, 54, 47

[56] References Cited

U.S. PATENT DOCUMENTS

| | | | |
|---|---|---|---|
| 5,161,142 | 11/1992 | Okano | 369/50 |
| 5,182,741 | 1/1993 | Maeda et al. | 369/58 |
| 5,444,687 | 8/1995 | Okumura | 369/48 |
| 5,446,707 | 8/1995 | Arakik | 369/13 |
| 5,471,450 | 11/1995 | Yonemitsu et al. | 369/60 |
| 5,491,677 | 2/1996 | Sasaki | 369/54 |

*Primary Examiner*—Nabil Hindi
*Attorney, Agent, or Firm*—Ratner & Prestia

[57] ABSTRACT

A disk nearly constant in recording density from the outer circumference to the inner circumference of the disk, such as CLV and M-CAV format, is rotated at a constant angular velocity to read out information, and the information being read in at a varying read transfer speed depending on the position on the disk from the optical pickup is stored once in a buffer memory. The information stored in the buffer memory is sent out at a constant send transfer speed. When reproducing from a disk-shaped recording medium nearly constant in recording density in the inner and outer circumference, the disk information is read at a constant rotating angular velocity, and the information varying in read transfer speed depending on the disk position is outputted at a constant send transfer speed suited to the reproduction of information such as voice and picture. The host computer or the like for controlling the apparatus is not required to distinguish the type of medium or recording format, or perform processing such as control of the transfer speed. Furthermore, when outputting the stored information, means for setting the send transfer speed by an external device or switch inside the apparatus is provided. By this means, the information can be reproduced at a transfer speed suited to the content of the information being handled.

22 Claims, 6 Drawing Sheets

DISK INFORMATION READING CONTROL APPARATUS HAVING A VARIABLE READ TRANSFER SPEED AND A DISK INFORMATION READING CONTROL METHOD

This application is a continuation of application Ser. No. 08/505,619 filed Jul. 21, 1995, now abandoned.

FIELD OF THE INVENTION

The present invention relates to an information reading control apparatus of a disk and an information reading control method of a disk for storing once the information in a memory device and then putting out the information at a specific transmit transfer speed, by using a disk-shaped recording medium such as optical disk and magnetic disk in which information is recorded nearly at same recording density from inner circumference to outer circumference of a disk, by rotating the disk at a specific rotating speed for reproducing by a disk type information recording device for recording/reproducing information, and reading out at different reading transfer speed depending on the radius on a medium in which information is recorded from the disk-shaped recording medium.

BACKGROUND OF THE INVENTION

The optical disk represented by compact disc and laser disc has recently come to be used as memory device for computer, aside from music or video use, and is expected to be applied widely, because the medium life is long owing to contact-free recording and reproducing, the recording density is high owing to recording in the information unit varied in the reflectivity called bit of about 0.5 $\mu$m of width and 0.5 to 2 $\mu$m of length, for example, and the access speed for searching desired information is faster as compared with the device using tape medium.

In such disk-type information recording device, in particular, in an optical disk device, various methods have been proposed for recording and reproducing information recorded in an optical disk, of which principal ones are described below.

One is the Constant Angular Velocity (CAV) format. In this format, the recording density differs between the inner circumference and outer circumference of the optical disk, and it is designed to record in a format in which the recording length representing same information is longer in the pit length of the outer circumference than the pit length of the inner circumference. This optical disk is rotated at a constant angular velocity, and the information is read out.

The other is the Constant Linear Velocity (CLV) format. In this format, the recording density is nearly identical in the inner circumference and outer circumference of an optical disk, and it is designed to record in a format in which the recording length representing same information is almost equal between the pit length of the inner circumference and the pit length of the outer circumference. By varying the rotating speed of this optical disk depending on the track radius, the linear running velocity in the track direction relative to the pickup is kept constant, and the information is read out.

The CAV format is suitable to high speed access because it is not necessary to vary the rotating speed of the disk depending on the reproducing position, but the recording density is lowered in the outer circumference, and the utility rate of the medium is low. The CLV format is suited to large capacity recording because the recording density of the disk inner circumference and outer circumference is constant as compared with the CAV format. Hence, the CLV format is suited to handling of continuous information, such as audio information and video information, having a very large series of information, and is widely used in the laser disc (LD) and compact disc (CD).

An information reading control apparatus using a conventional optical disk of CLV format is described below with reference to a drawing.

FIG. 4 is a block diagram showing the reproduction system of an information reading control apparatus of CLV format in a prior art. In the diagram, reference numeral 101 is an optical disk, that is, a recording medium, 102 is an optical pickup device, 103 is an information reproducing circuit, 105 is a clock reproducing circuit, 107 is a constant frequency oscillator, 109 is a data bus, 111 is a motor rotation control circuit, and 120 is a motor.

In thus constituted reproduction system of the information reading control apparatus of conventional CLV format, the operation is described below.

The optical pickup device 102 moves to a specified place on the optical disk 101 rotated by the motor 120, and controls the read lens in the optical pickup device, and reproduces the information from the optical disk 101. At this time, the clock reproducing circuit 105 reproduces a clock signal buried in the signal recorded at constant interval on the optical disk, from the information signal being read out by the optical pickup 101, compares it with the frequency of the constant frequency oscillator 107, and sends out a control signal to the motor rotation control circuit 111 which controls the rotation of the motor 120, so that the frequency of the reproduced buried clock signal may be constant.

The motor rotation control circuit 111 controls the rotating speed of the motor 120, that is, the rotating speed of the optical disk 101, so that the read buried clock signal may be constant relative to the optical pickup 102, that is, the linear running velocity in the track direction may be always constant, on the basis of the control signal from the clock reproducing circuit 105. The information reproducing circuit 103 is synchronized with the clock delivered at a constant frequency from the constant frequency oscillator 107, and reads out the data at a constant transfer speed from the optical pickup device 102, according to the information reproducing clock of constant frequency supplied from the clock reproducing circuit 107, and sends out to the data bus 109.

Incidentally, the features of both CAV and CLV formats are realized simultaneously in a Modified Constant Angular Velocity (M-CAV) format. In this format, the disk is divided into plural recording regions in the radial direction so that the recording density on the disk may be almost constant, and the number of sectors per circumference of disk or recording frequency is varied so that the number may be equal within a same recording region, and different between different regions, and by using the optical disk of such format, it is rotated at a constant angular velocity (constant rotating speed), and the information is read out. In this format, since the rotation of disk is a constant speed, it is suited to high speed access of information, and at the same time its recording capacity is equivalent to that of the CLV format, but it is required to vary the reading speed so as to be slow in the inner circumference and fast in the outer circumference.

The conventional M-CAV format is described below with reference to a drawing.

FIG. 5 is a block diagram showing the reproduction system of an information reading control apparatus of M-CAV format of other prior art. In FIG. 5, reference numeral 201 is an optical disk, 202 is a optical pickup device, 203 is an information reproducing circuit, 205 is an optical pickup position detecting circuit, 209 is a data bus, 213 is a variable frequency oscillator, and 220 is a motor.

In thus constituted reproduction system of the information reading control apparatus of M-CAV format, the operation is described below.

First, the optical disk 201 is accessed by the optical pickup device 202 for information reproduction. The optical pickup position detecting circuit 205 detects which region on the disk divided into regions in the radial direction the optical pickup 202 is reproducing, from the information reproduced by the information reproducing circuit 203, issues a frequency selection signal depending on the information reproducing region to the variable frequency oscillator 213. The variable frequency oscillator 213 produces a clock at a frequency corresponding to the recording region being accessed by the optical pickup. The information reproducing circuit 203 reads out data from the optical disk 201 by using the optical pickup device 202 according to the selected clock, and sends to the data bus 209 at a transfer speed corresponding to the recording region on the optical disk 201.

In the M-CAV format, as described above, the disk is divided into plural regions in the radial direction so that the information recording density may be nearly constant in the inner circumference and outer circumference of the disk. The information quantity recorded on the optical disk is recorded so as to be greater in one outer circle than in one inner circle of the disk. Therefore, when thus recorded disk is rotated at a constant speed, the information transfer speed in one recording region is constant, but since the recording density varies in each recording region, the transfer speed of the information being readout is greater in the outer recording region than in the inner recording region.

The recording forms of optical disks of various formats are schematically shown in FIGS. 6, 7, and 8. FIG. 6 is a schematic diagram of a recording form of an optical disk 301 of CAV format at constant rotating speed. In FIG. 6, a central hole 301a is for rotating by attaching to the motor of the recording and reproducing apparatus. In a sector address 301b at number 0, a sector number showing the rotational angle and an address number showing the track position are preliminarily provided in each track. In FIG. 6, the disk is divided into 18 sectors at equal angles. Each sector has a sector address 301d. The sector length of a certain track is indicated by arrow 301c. As mentioned above, in the CAV format, the physical length of the sector is longer at the outer side, but since the optical disk rotates at same speed, the required time for recording or reproducing of one sector is same in the inner circumference and outer circumference. In this way, the information is recorded more coarsely in the outer circumference than in the inner circumference on the optical disk.

FIG. 7 is a schematic diagram of recording form of the optical disk 101 of CLV format at constant linear velocity. Reference numeral 101a denotes a central hole, 101b is a sector address, and each sector length is indicated by arrow 101c for explanation. In FIG. 7, for convenience sake, spiral tracks of very coarse pitches are shown, but the actual track pitch is about 1 to 2 μm. The buried clock signal in the signal recorded at constant interval on the disk described in the block diagram of the apparatus in FIG. 4 may be recorded in each sector address 101b in FIG. 7, or recorded in the sector at proper interval. As shown in FIG. 7, in the disk of CLV format, each sector length 101c is constant from the inner circumference to the outer circumference. Accordingly, the sector address positions may not be aligned between adjacent tracks, the sectors as unit length of information may be discontinuous at the time of track jump, or the recognition of sector address may be delayed because the reading timing of the sector address varies. Or, when searched by crossing many tracks, aside from the above problems, it takes time in change of rotating speed.

FIG. 8 is a schematic diagram of recording form of the optical disk 201 of M-CAV format. Reference numeral 201a is a central hole, and in a sector address 201b at number 0, a sector number showing the rotational angle and an address number showing the track position are preliminarily provided in each track. Reference numeral 201d represents a sector address. In FIG. 8, dividing into four regions R1 to R4 in the radial direction, and the region R1 is divided into 12 sectors, the region R2 into 15 sectors, the region R3 into 16 sectors, and the region R4 into 18 sectors, at equal angle in each region, and each sector length 201c is nearly same on the entire disk. The arrow 201c showing the sector length is provided for the sake of explanation, and, unlike the CAV format, the physical length of sector does not become longer as going to the outer circumference, and the physical length of any sector is almost constant in any region. Therefore, rotating at a constant angular velocity, the information recording density in the inner and outer circumference is kept almost constant. However, in each region, the information recording quantity in one circle varies as mentioned above, while the required time for one circle is constant, and hence the information recording and reproducing speed (or transfer speed) becomes faster in the outer region R4 than in the inner region R1.

In the optical disk of M-CAV format, therefore, since the recording density varies in each recording region, when rotated at a constant angular velocity, the information reading speed, that is, the transfer speed is different between the inner circumference and outer circumference of the disk, and the data cannot be read out at a constant transfer speed. It is hence difficult to apply to the information of sound and picture that requires information reproduction at a constant transfer speed. On the other hand, in the case of the optical disk of CLV format, although the information is reproduced at constant transfer speed by varying the rotating speed of the optical disk so that the linear velocity of the track direction for information reproduction may be constant on the disk, it is needed to vary the rotating speed of the motor of a large moment of inertia depending on the track radius, and there was a limit for accelerating the information search speed over the entire inner and outer circumferences. In addition, complicated rotation control was required for adjusting the motor rotating speed to a desired rotating speed in each access of information.

SUMMARY OF THE INVENTION

It is hence a primary object of the invention to solve the problems of the prior art of the optical disk in the format differing in the transfer speed between the inner circumference and outer circumference when reproduced at a constant rotating speed, such as M-CAV format and CI,V format, and to present means for reproducing information being read out at different reading transfer speed depending on the recording position on the disk from the optical disk at a constant send transfer speed, when the disk is rotated at a constant rotating speed, by using optical disk recorded in M-CAV format or CLV format.

To achieve the object, the invention provides a disk information reading control apparatus and a disk information reading control method comprising:

a disk-shaped recording medium changing in the reading speed depending on the information reproducing position when the information is read by rotating the recording medium at a constant angular velocity rotation control means for rotating the disk-shaped recording medium at a constant angular velocity, pickup means for reading out the information from the recording medium, position control means for moving and controlling the pickup means to a desired position on the disk-shaped recording medium, memory means for storing the information reproduced from the pickup means, write control means for writing information into the memory means, read control means for reading the information from the memory means, and interface means for sending out the read information to an external device, wherein the information reproduced from the disk-shaped recording medium is stored in the memory means by the write control means at the read transfer speed being read out from the disk-shaped recording medium, and sent out to the interface means at a constant send transfer speed from the memory means by the read control means.

In this constitution or method, specifically, the read transfer speed is needed to be equal to or faster than the send transfer speed.

The constitution or method further comprises:

memory remainder detecting means for detecting an empty memory remainder of the memory means, and pickup control means for controlling information reading of the pickup and temporary stop of information reading, wherein the information reading from the disk-shaped recording medium is stopped temporarily by the pickup control means when the empty memory region of the memory means is less than a specific amount as detected by the memory remainder detecting means.

The constitution or method is further designed to set the pickup control means in reading state when the empty memory region of the memory means is over a specific amount as detected by the memory remainder detecting means.

By this constitution or method, in the disk of CLV format or M-CAV format to be reproduced at variable rotating speed, with a nearly constant recording density from the outer circumference to the inner circumference, the information is reproduced at a constant rotating speed, and the information being read in at a read transfer speed changing from the optical pickup is once stored in the memory means.

When the empty memory region of the memory means becomes less than a specific amount as detected by the memory remainder detecting means, the information reading from the disk-shaped recording means is temporarily stopped by the pickup control means. When the empty memory region of the memory means becomes more than a specific amount as detected by the memory remainder detecting means, the pickup control means is set in reading state.

In this way, while controlling the memory remainder of the memory means, the information stored in the memory means is outputted at a constant send transfer speed.

As a result, when reproducing from the disk-shaped recoding medium almost constant in the recording density from the inner circumference to the outer circumference, if the disk is rotated at a constant rotating angular velocity, the information can be reproduced at a constant transfer speed suited to reproduction of information such as sound and picture, and the search speed can be also increased. Hence, the host computer or the like for controlling the apparatus of the invention is not required to distinguish the type of medium or recording format, or process the control of transfer speed or the like.

In a selective constitution or method, the read control means for recording the information from the memory means comprises read variable means for varying the read speed, and the read speed is varied by controlling the read variable means by an input from an external device or changeover means in the apparatus.

By such selective constitution or method, by setting the transfer speed by a switch in an external device or in the apparatus, the information can be reproduced at a transfer speed suited to the content of the information being handled.

DETAILED DESCRIPTION OF THE EMBODIMENTS

Referring now to a drawing, a first embodiment of the invention is described below.

Figure 1:
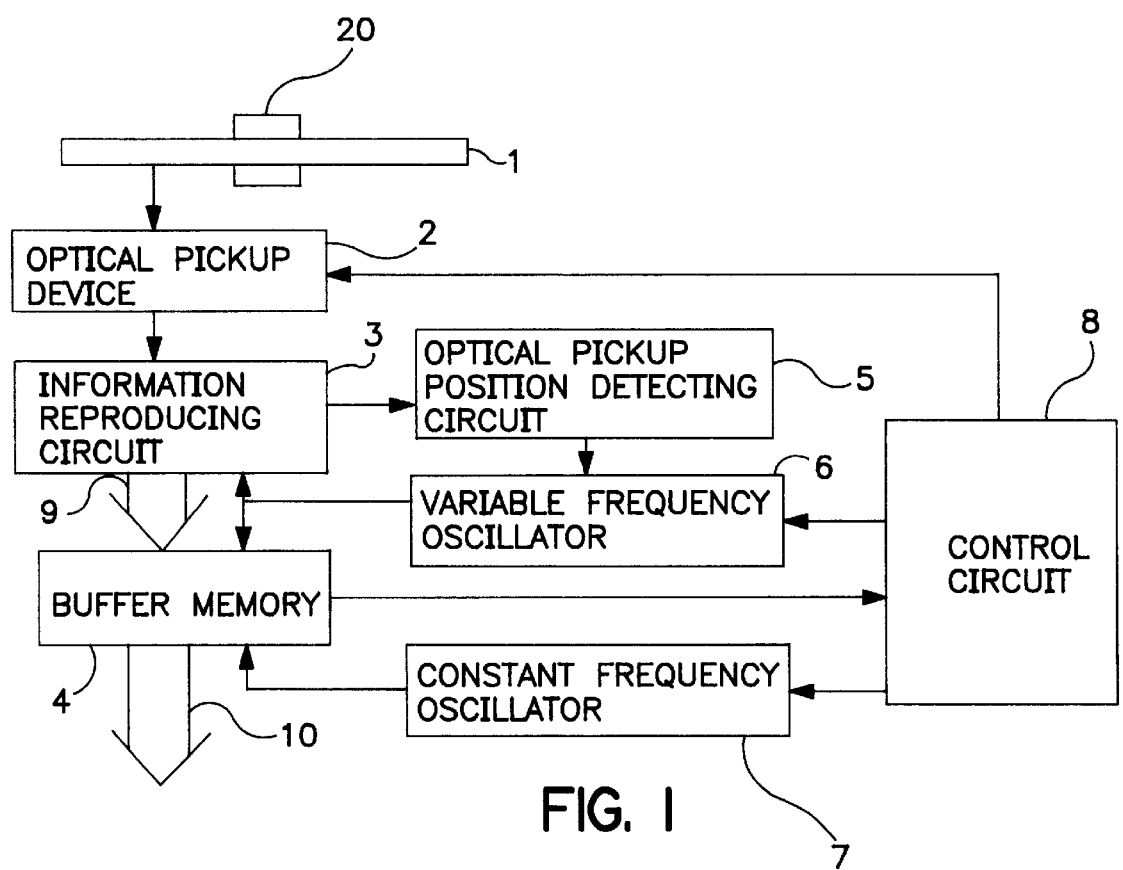
FIG. 1 is a block diagram of an information reading control apparatus of an optical disk in a first embodiment of the invention.

FIG. 1 is a block diagram of an information reading control apparatus of an optical disk in the first embodiment of the invention. In FIG. 1, reference numeral 1 denotes an optical disk, 2 is an optical pickup device, 3 is an information reproducing circuit, 4 is a buffer memory, 5 is an optical pickup position detecting circuit, 6 is a variable frequency oscillator, 7 is a constant frequency oscillator, 8 is a control circuit, and 9, 10 are data buses.

In thus constituted information reading control apparatus of optical disk, the operation is described with reference to FIG. 1. First, a specified track on the optical disk 1 is accessed by the optical pickup device 2. The optical pickup position detecting circuit 5 detects the position on the disk of the information being reproduced, from the period signal or the like of the clock signal in the information reproduced by the information reproducing circuit 3. The variable frequency oscillator 6 issues a clock for information reading at a frequency depending on the position on the disk of the optical pickup 2 obtained by the optical pickup position detecting circuit 5, to the information reproducing circuit 3. At the same time, this clock becomes a write clock of the buffer memory 4. The information reproducing circuit 3 synchronizes the data from the optical pickup device 2 with the write clock, and sends out to the data bus 9 at a read transfer speed variable depending on the information. position on the disk.

The data sent out into the data bus 9 is once written into the buffer memory 4 by using the write clock. The data written into the buffer memory 4 is read out from the buffer memory 4 by a read clock at a constant frequency generated in the constant frequency oscillator 7 for reproducing the information at a constant transfer speed (send transfer speed) from the optical disk apparatus of the invention, and is sent out from the information reading control apparatus of optical disk of the invention through the data bus 10 which is interface means.

The buffer memory 4 is realized, for example, by using a dual port RAM, which can be done, in this case, independently of the input and output of data by using write clock and read clock. At this time, in the buffer memory 4, synchronizing with the write clock, the data is entered from the data bus 9, while the data is sent out into the data bus 10 in synchronism with the read clock.

When the data quantity being read out from the optical disk 1 and stored in the buffer memory 4 is nearly equal to or smaller than the capacity of the buffer memory 4, the buffer memory 4 sends, for example, a buffer memory capacity detection signal to the control circuit 8 as [1] (High), telling that the buffer memory 4 is nearly filled up. The control circuit 8 detecting that the buffer memory capacity detecting signal is [1] sends out a command for stopping reproduction to the information reproducing circuit 3 and optical pickup device 2, and simultaneously stops the pulse of the write clock sent out to the buffer memory 4 through the information reproducing circuit 3 through the variable frequency oscillator 6. As a result, data does not flow from the information reproducing circuit 3 to the data bus 9. The optical pickup device receiving the reproduction stopping command from the control circuit 8 repeats the step of moving to the original track after tracing one track by the technique of track jump and waiting for one revolution, and temporarily stops the reproduction and access action while maintaining the reproduction position by tracing on the same track.

Even after the optical pickup device 2 temporarily stops the access action, the data stored in the buffer memory 4 continues to be read out at a constant transfer rate by the clock of the constant frequency oscillator 7, and is sent out from the optical disk apparatus of the invention through the data bus 10. As the data is continuously read out from the buffer memory 4, when the data quantity stored in the buffer memory 4 becomes less than a specific amount or before it becomes nearly zero, the buffer memory 4 sends [0] (or Low) as the buffer memory capacity detecting signal to the control circuit 8, telling that the buffer memory 4 is nearly empty.

The control circuit 8 detecting that the buffer memory capacity detecting signal is Low issues a command for accessing and resuming data reproduction to the variable frequency oscillator 6 and optical pickup device 2. Receiving the resuming command, the optical pickup device 2 stops track jump, and reads out the information from the next sector of the one stopping the reading the previous time, or resumes data reading through the procedure of accessing the track at the present position as if accessing a new track. At the same time, the variable frequency oscillator 6 reads out the information from the optical disk, and resumes output of the write clock for writing data into the buffer memory 4. Consequently, the data output is resumed from the information reproducing circuit 3 into the data bus 9, and data is stored again in the buffer memory 4.

By repeating this operation, if the transfer speed-of the data being read out from the information reproducing circuit 3 exceeds the transfer speed of the data outputted from the buffer memory 4, it is possible to reproduce without filling up the buffer memory 4 with data or interrupting the data outputted from the buffer memory 4.

According to the embodiment, thus, when the optical disk of h-CAV format or CLV format is rotated at a constant angular velocity, the information reproduced at a transfer speed different between the inner circumference and outer circumference of the disk from the optical disk is once stored in the buffer memory, and, is readout at a constant transfer speed, so that the information recorded in the optical disk can be reproduced at a constant transfer speed and produced from the optical disk apparatus.

The embodiment is constituted so as to detect the period of the clock signal in the information reproduced in the information reproducing circuit 3, and detect the position on the disk reproducing the information, but, instead, the address signal, synchronizing signal or sector signal being read out from the optical disk may be also used. Moreover, the position on the disk may be detected by a position detector using an external linear encoder or the like interlocked with the move of the optical pickup device. Still more, instead of the position detecting signal, the period or frequency of the specific period signal contained in the synchronizing signal reproduced when rotated at a constant angular velocity may be measured, and a clock for reproduction may be generated by PLL or the like. As the variable frequency oscillator 6, a frequency synthesizer capable of dividing or multiplying by digital value or the like may be also used.

A second embodiment of the invention is described below while referring to a drawing.

Figure 2:
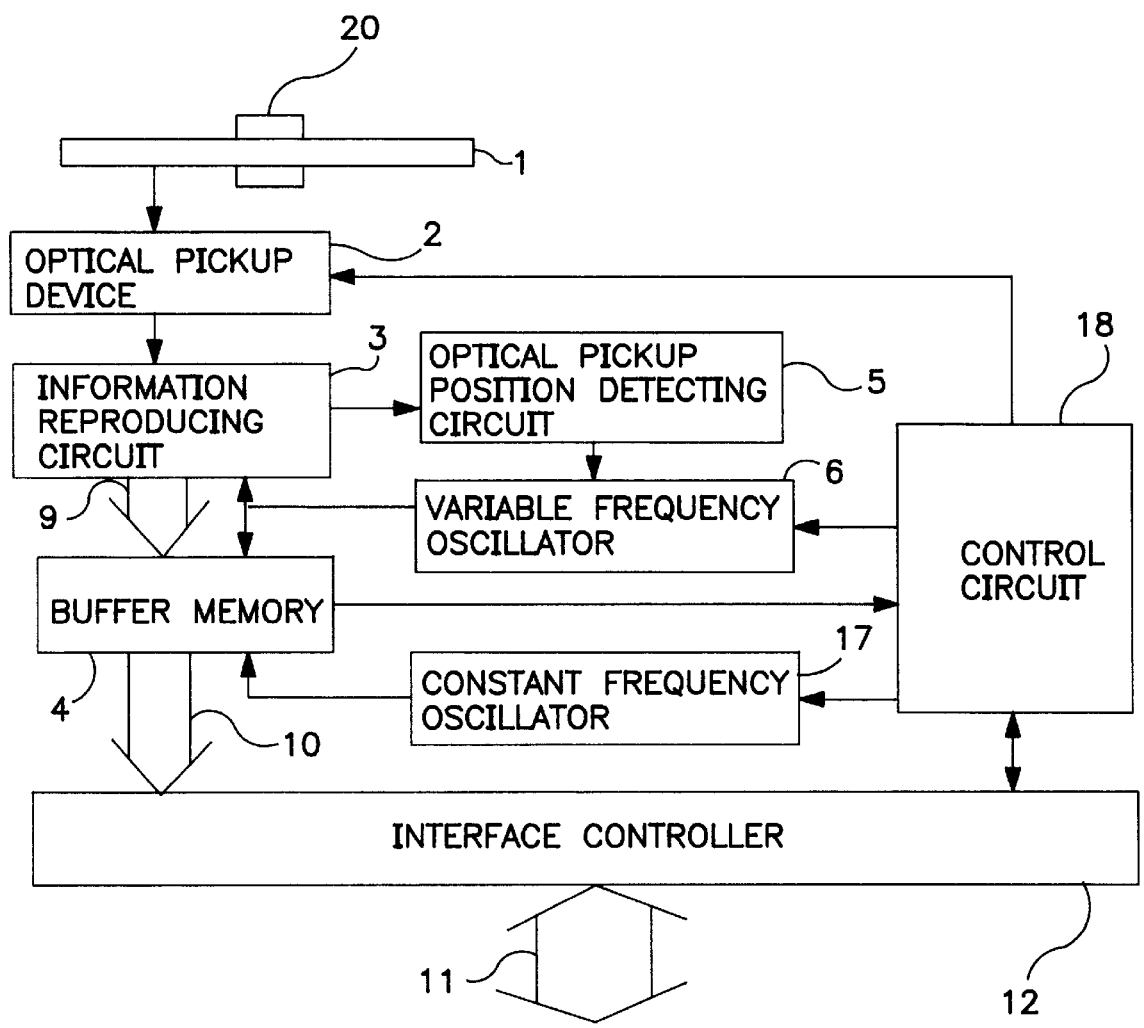
FIG. 2 is a block diagram of an information reading control apparatus of an optical disk in a second embodiment of the invention.

FIG. 2 is a block diagram of an information reading control apparatus of an optical disk in the second embodiment of the invention. In FIG. 2, the optical disk 1, optical pickup device 2, information reproducing circuit 3, buffer memory 4, optical pickup position detecting circuit 5, and variable frequency oscillator 6 are same as in the first embodiment. In addition to this constitution, the second embodiment also comprises a controller circuit 18, and an interface controller 12 for controlling the exchange of data between the controller circuit 18 and external interface 11 of the optical disk apparatus and commands for controlling the optical disk apparatus, and the controller circuit 18 of the optical disk apparatus is operated by the command given from the external device through the external interface 11 and interface controller 12, and the frequency of the constant frequency oscillator 17 is selected by the controller circuit 18.

In thus constituted information reading control apparatus of optical disk of the second embodiment, the operation is described with reference to FIG. 2. When the optical disk 1 of M-CAV format or CLV format is rotated at a constant angular velocity , the data being read out through the optical pickup device 2 and information reproducing circuit 3 is, same as in the case of the first embodiment, written into the buffer memory 4 by a clock signal at a frequency set by the variable frequency oscillator 6 depending on the position on the disk for reading out the information. The data written into the buffer memory 4 is read out from the buffer memory 4 by a clock signal at a frequency set in a constant frequency oscillator 17 oscillating at a constant frequency regardless of the information reproducing position on the disk, and is sent out into the interface 11 with the external device through the interface controller 12. In the constitution of the embodiment, the oscillation frequency of the constant frequency oscillator 17 is set in the controller circuit 18 of the optical disk apparatus through the interface 11 and interface controller 12 from the external device, and the controller circuit 18 sets the oscillation frequency in the constant frequency oscillator 17 so as to oscillate at this frequency. The set frequency is constant regardless of the radius of the disk, but the constitution for setting two or more types of frequency by a command from external device can be easily realized.

This is the measure for the recent tendency that the programs and images of games or the like are recorded in the disk on the condition that the transfer rate of signal being read out from the disk is a certain value (for example, 150 KB/sec or 300 KB/sec). This embodiment is intended to present an information reading control apparatus of optical disk having an optimum transfer rate for the information being read out, by enabling to set several transfer rates on the basis of the control of the external interface, which are necessary when reading out the information recorded in the optical disk.

A third embodiment of the invention is described below with reference to a drawing.

Figure 3:
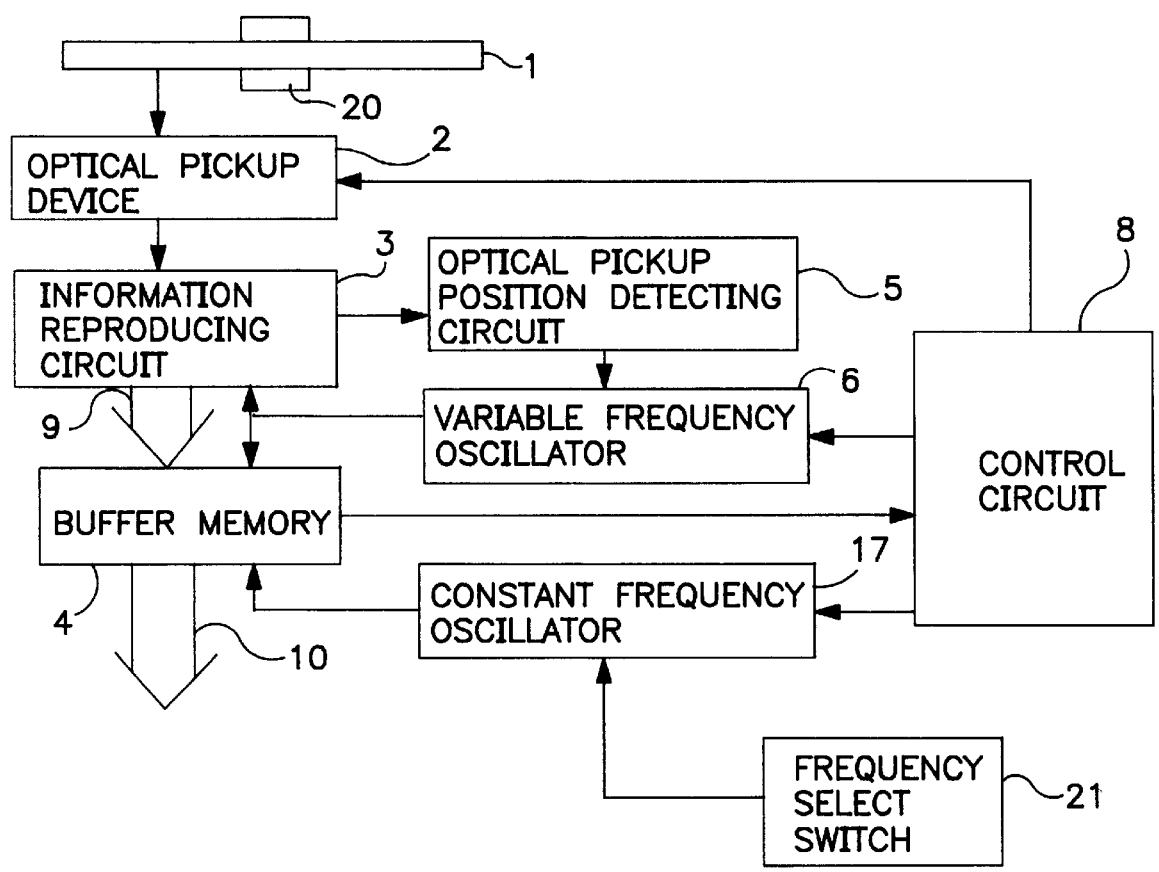
FIG. 3 is a block diagram of an information reading control apparatus of an optical disk in a third embodiment of the invention.
Figure 4:
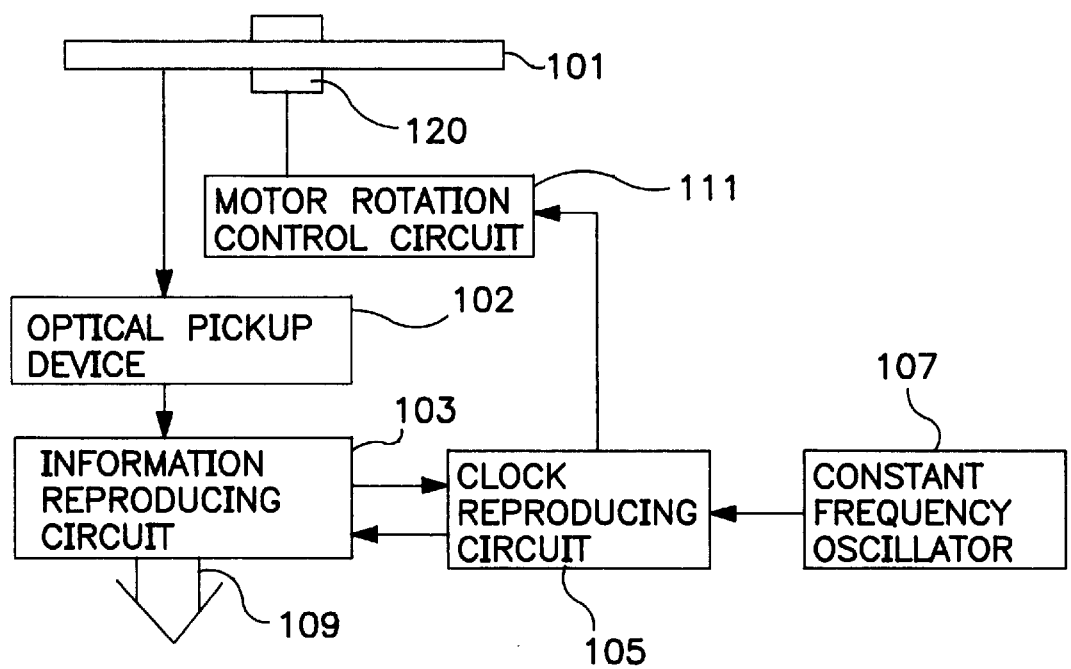
FIG. 4 is a block diagram of an information reading control apparatus of an optical disk in CLV format in a prior art.
Figure 5:
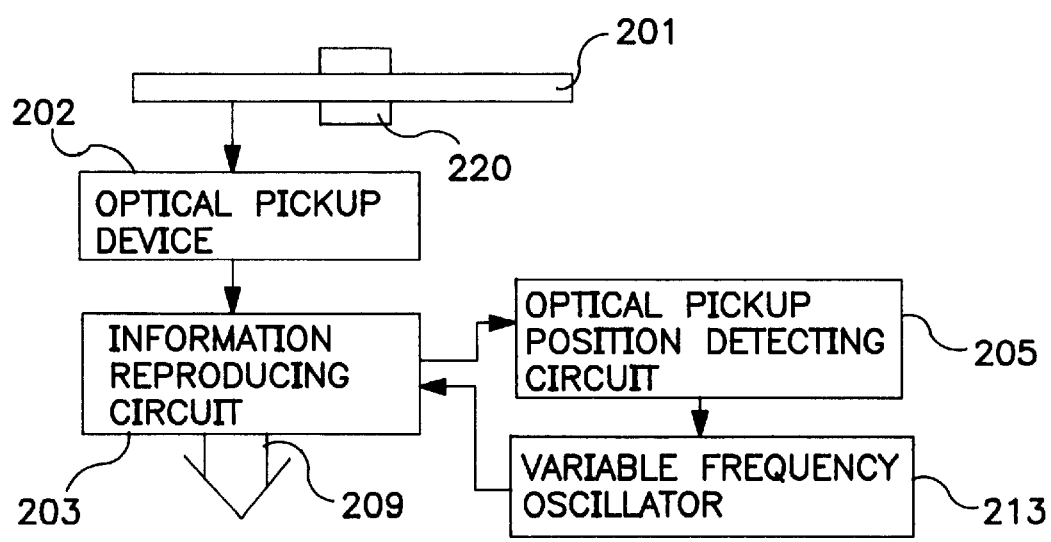
FIG. 5 is a block diagram of an information reading control apparatus of an optical disk in M-CAV format in other prior art.
Figure 6:
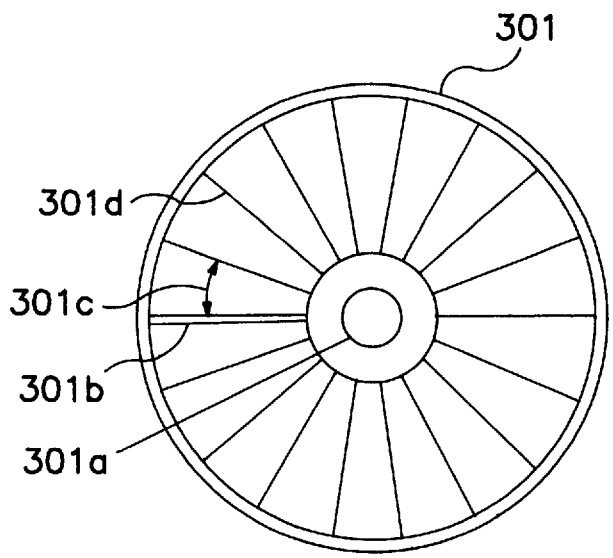
FIG. 6 is a schematic diagram showing a disk of CAV format.
Figure 7:
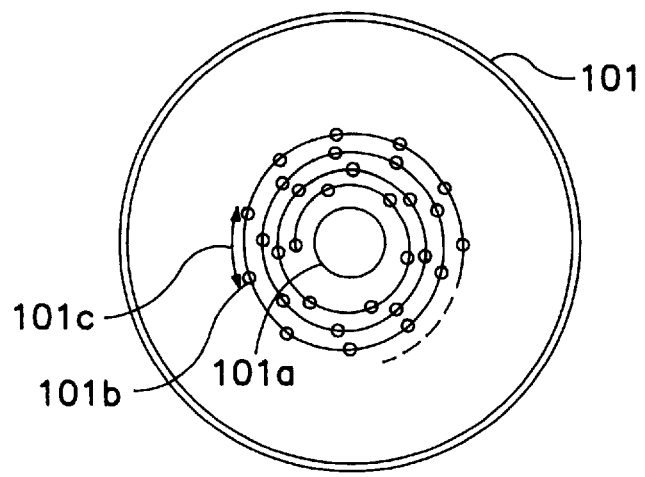
FIG. 7 is a schematic diagram showing a disk of CLV format.
Figure 8:
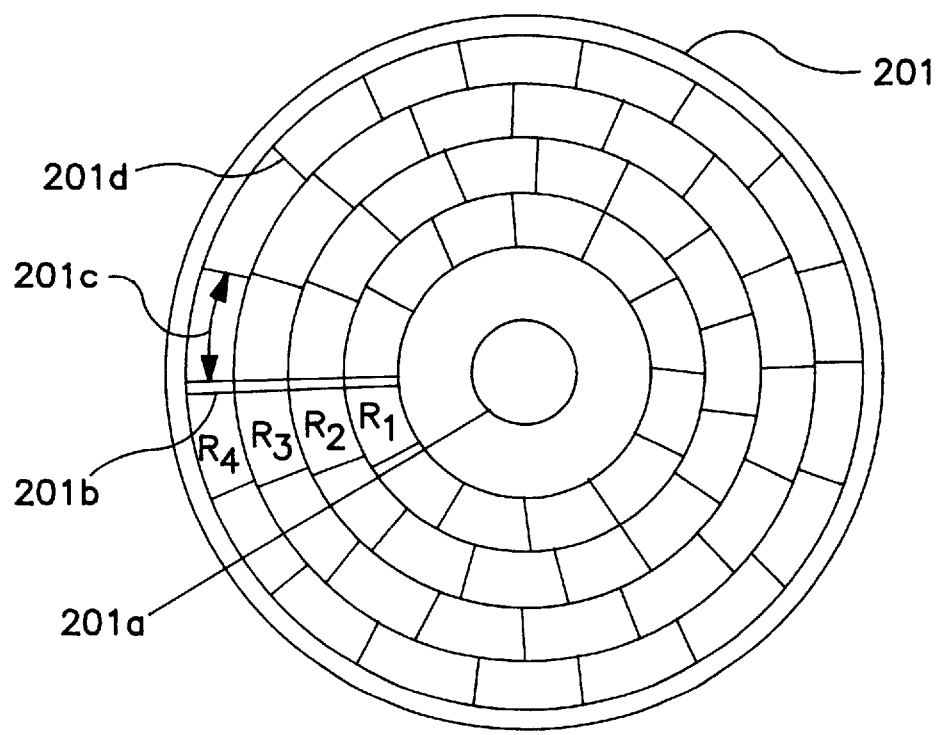
FIG. 8 is a schematic diagram showing a disk of M-CAV format.

FIG. 3 is a block diagram of an information reading control apparatus of an optical disk in the third embodiment of the invention. In FIG. 3, the constitution is same as in the first embodiment, except that the oscillation frequency of the constant frequency oscillator 17 is designed to be selected by a frequency select switch 21.

In thus constituted information reading control apparatus of the optical disk, the operation is described below. When the optical disk 1 of M-CAV format or CLV format is rotated at a constant angular velocity, the data being read out through the optical pickup device 2 and information reproducing apparatus 3 is written into the buffer memory 4 by the clock signal at a frequency set by the variable frequency oscillator 6 depending on the position on the disk for reading out the information. The data written into the buffer memory 4 is read out from the buffer memory 4 by a clock signal at a frequency set in the constant frequency oscillator 17 oscillating at a constant frequency regardless of the information reproducing position on the disk, and is sent to outside. The oscillation frequency of the constant frequency oscillator 17 is selected, in the constitution of the embodiment, by the frequency select switch 21, and the oscillation frequency is preset in the constant frequency oscillator 17 so as to oscillated at a selected frequency. The frequency to be set may be a fixed value regardless of the position on the disk radius same as in the second embodiment, but two or more types of frequency can be set easily by setting of the frequency select switch 21.

In this embodiment, too, same as in the second embodiment, the programs and images of games or the like are often recorded in the disk on the condition that the transfer rate of signal being read out from the disk is a certain value (for example, 150 KB/sec or 300 KB/sec). In this embodiment, several transfer rates necessary when reading out the information recorded in such disk can be set by the transfer rate setting switch 21 provided in the apparatus, thereby presenting an information reading apparatus of optical disk having an optimum transfer rate in the information being read out.

According to the information reading control apparatus of disk of the invention, when the optical disk of M-CAV format or CLV format is rotated at a constant angular velocity, the information is read out at different read transfer speeds, and this information being read out at different transfer speeds can be reproduced at a constant send transfer speed. Therefore, information of sound and picture can be reproduced at a constant transfer speed. Besides, by reproducing the optical disk of CLV format at a constant rotating speed (a constant angular velocity), it is not necessary to vary the rotating speed of the motor, and the access speed to the disk is faster, and the rotation motor may be smaller in size and lower in torque.

Moreover, by setting the transfer speed of the information stored in the buffer memory by the external device or a switch in the apparatus, the information can be reproduced from the disk at a transfer speed suited to the information being handled.

In the foregoing embodiments, the optical disk is used as the recording medium, but the invention is not limited to this, and not limited to the optomagnetic disk, magnetic recording medium, or other mechanical or capacitive recording principle, it can be widely applied to the information reading control apparatus using disk-shaped recording media.

As the required condition of the invention, the read speed fp of the optical pickup device 2 must be same as or faster than the read speed fm of the buffer memory 4 at any position on the disk, and as far as this condition is satisfied, the disk format may be different from CLV or M-CAV, and, for example, it Ray be applied when reproducing the disk of Modified Constant Linear Velocity (M-CLV) format for changing over the rotating speed every time the region is changed by using a disk of a format similar to M-CAV, or when reproducing at a higher rotating speed than the rotating speed when recorded, even in CAV format.

Numerical values and illustrations used in the embodiments are only examples, and are not limitative, and details may be modified in the scope not departing from the true spirit of the invention.

What is claimed is:

1. An information reading control apparatus for a disk comprising:

a disk-shaped recording medium changing in the reading speed depending on the information reproducing position when the information is read by rotating at a constant angular velocity, rotation control means for rotating the disk-shaped recording medium at a constant angular velocity, pickup means for reading out the information from the disk-shaped recording medium, position control means for moving and controlling the pickup means to a desired position on the disk-shaped recording medium, memory means for storing the information reproduced from the pickup means, at a changing read transfer speed, a variable frequency oscillator for providing a clock signal, write control means for writing information into the memory means based on said clock signal, variable rate read control means for reading the information from the memory means at one of a plurality of rates, wherein any of said plurality of rates are selected from an external device and interface means for sending out the read information to said external device, wherein the information reproduced from the disk-shaped recording medium is stored in the memory means by the write control means at the changing read transfer speed determined from information provided by the disk-shaped recording medium, and sent out to the interface means at a send transfer speed from the memory means by the read control means.

2. An information reading control apparatus for a disk comprising:

a disk-shaped recording medium changing in the reading transfer speed depending on the information reproducing position when the information is read by rotation at a constant angular velocity, rotation control means for rotating the disk-shaped recording medium at a constant angular velocity, pickup means for reading out the information from the disk-shaped recording medium, position control means for moving and controlling the pickup means to a desired position on the disk-shaped recording medium, memory means for storing the information reproduced from the pickup means, at a changing read transfer speed, a variable frequency oscillator for providing a clock signal, write control means for writing information into the memory means based on said clock signal, variable rate read control means for reading the information from the memory means at one of a plurality of rates, wherein any of said plurality of rates are selected from an external device and interface means for sending out the read information to said external device, wherein the information reproduced from the disk-shaped recording medium is stored in the memory means by the write control means at the changing read transfer speed determined from information provided by the disk-shaped recording medium, and sent out to the interface means at a send transfer speed from the memory means by the read control means, and the read transfer speed is same as or faster than the send transfer speed.

3. An information reading control apparatus for a disk of claim 1, further comprising:

memory remainder detecting means for detecting an empty memory remainder of the memory means, and pickup control means for controlling information reading of the pickup and temporary stop of information reading, wherein the information reading from the disk-shaped recording medium is stopped temporarily by the pickup control means when the empty memory region of the memory means is less than a specific amount as detected by the memory remainder detecting means.

4. An information reading control apparatus for a disk of claim 2, further comprising:

memory remainder detecting means for detecting an empty memory remainder of the memory means, and pickup control means for controlling information reading of the pickup and temporary stop of information reading, wherein the information reading from the disk-shaped recording medium is stopped temporarily by the pickup control means when the empty memory region of the memory means is less than a specific amount as detected by the memory remainder detecting means.

5. An information reading control apparatus for a disk of claim 3, wherein it is designed to set the pickup control means in reading state when the empty memory region of the memory means is over a specific amount as detected by the memory remainder detecting means.

6. An information reading control apparatus for a disk of claim 4, wherein it is designed to set the pickup control means in reading state when the empty memory region of the memory means is over a specific amount as detected by the memory remainder detecting means.

7. An information reading control apparatus for a disk of claim 1, wherein the read control means of the memory means comprises read variable means for varying the read speed, and the read speed is varied by controlling the read variable means by an input from an external device or changeover means in the apparatus.

8. An information reading control apparatus for a disk of claim 3, wherein the read control means of the memory means comprises read variable means for varying the read speed, and the read speed is varied by controlling the read variable means by an input from an external device or changeover means in the apparatus.

9. An information reading control apparatus for a disk of claim 4, wherein the read control means of the memory means comprises read variable means for varying the read speed, and the read speed is varied by controlling the read variable mean by an input from an external device or changeover means in the apparatus.

10. An information reading control apparatus for a disk of claim 5, wherein the read control means of the memory means comprises read variable means for varying the read speed, and the read speed is varied by controlling the read variable means by an input from an external device or changeover means in the apparatus.

11. An information reading control apparatus for a disk of claim 6, wherein the read control means of the memory means comprises read variable means for varying the read speed, and the read speed is varied by controlling the read variable means by an input from an external device or changeover means in the apparatus.

12. An information reading control apparatus for a disk of claim 1, wherein the disk-shaped recording medium is a disk recorded at a constant linear velocity.

13. An information reading control apparatus for a disk of claim 1, wherein the disk-shaped recording medium is divided into plural regions in the radial direction, the number of divisions in the rotational angle direction in each region is identical, and information is recorded by varying the recording frequency in every region so that the recording density of the entire disk-shaped recording medium may be nearly constant.

14. An information reading control apparatus for a disk comprising:
- a disk-shaped recording medium changing in the reading speed depending on the information reproducing position when the information is read by rotating at a constant angular velocity,
- rotation control means for rotating the disk-shaped recording medium at a constant angular velocity,
- pickup means for reading out the information from the disk-shaped recording medium,
- position control means for moving and controlling the pickup means to a desired position on the disk-shaped recording medium,
- memory means for storing the information reproduced from the pickup means, at a changing read transfer speed,
- a variable frequency oscillator for providing a clock signal,
- write control means for writing information into the memory means based on said clock signal,
- variable rate read control means for reading the information from the memory means at one of a plurality of rates, wherein any of said plurality of rates are selected from an external device,
- memory remainder detecting means for detecting an empty memory remainder of the memory means,
- pickup control means for controlling information reading of the pickup and temporary stop of information reading, and
- interface means for sending out the read information to said external device,
- wherein the information reproduced from the disk-shaped recording medium is stored in the memory means by the write control means at the changing read transfer speed determined from information provided by the disk-shaped recording medium, and
- sent out to the interface means at a send transfer speed from the memory means by the read control means, and, when the empty memory region detected by the memory remainder detecting means becomes less than a specific amount, the information reading from the disk-shaped recording medium is stopped temporarily by the pickup control means.

15. An information reading control for a disk comprising:
- a disk-shaped recording medium changing in the reading transfer speed depending on the information reproducing position when the information is read by rotation at a constant angular velocity,
- rotation control means for rotating the disk-shaped recording medium at a constant angular velocity,
- pickup means for reading out the information from the disk-shaped recording medium,
- position control means for moving and controlling the pickup means to a desired position on the disk-shaped recording medium,
- memory means for storing the information reproduced from the pickup means, at a changing read transfer speed,
- a variable frequency oscillator for providing a clock signal,
- write control means for writing information into the memory means based on said clock signal,
- variable rate read control means for reading the information from the memory means at one of a plurality of rates, wherein any of said plurality of rates are selected from an external device
- memory remainder detecting means for detecting an empty memory remainder of the memory means,
- pickup control means for controlling information reading of the pickup and temporary stop of information reading, and
- interface means for sending out the read information to said external device,
- wherein the information reproduced from the disk-shaped recording medium is stored in the memory means by the write control means at the changing read transfer speed determined from information provided by the disk-shaped recording medium,
- sent out to the interface means at a send transfer speed from the memory means by the read control means, and the read transfer speed is same as or faster than the send transfer speed, and
- when the empty memory region detected by the memory remainder detecting means becomes less than a specific amount, the information reading from the disk-shaped recording medium is stopped temporarily by the pickup control means.

16. An information reading control method for a disk of claim 14, wherein it is designed to set the pickup control means in reading state when the empty memory region of the memory means is over a specific amount as detected by the memory remainder detecting means.

17. An information reading control method for a disk of claim 15, wherein it is designed to set the pickup control means in reading state when the empty memory region of the memory means is over a specific amount as detected by the memory remainder detecting means.

18. An information reading control apparatus for reading information recorded on a disk-shaped recording medium, the apparatus comprising:
- rotation control means for rotating the disk-shaped recording medium at a constant angular velocity;
- a variable frequency oscillator for providing a clock signal,
- pickup means for
  a) reading the information from the disk-shaped recording medium, and
  b) providing the information at an information transfer speed as the disk-shaped recording medium is rotated by the rotation control means, the information transfer speed changing in relation to a position of said pickup means relative to the disk-shaped recording medium; and
- memory means for
  a) storing, based on said clock signal, the information provided by the pickup means at a memory write transfer speed which varies and which corresponds to the information transfer speed at the position of the pickup means relative to the disk-shaped recording medium, and
  b) providing the stored information from the memory means at one of a plurality of memory read transfer speeds which is selected from an external device.

19. The information reading control apparatus as recited in claim 18, further comprising:
- position control means for moving and for controlling the pickup means to the position relative to the disk-shaped recording medium;

write control means for
 a) determining the memory write transfer speed from the information transfer speed of the information provided by the pickup means, and for
 b) providing a write control signal to write information into the memory means, the information being stored in the memory means responsive to the write control signal at the write transfer speed; and read control means for providing a read control signal to read the information from the memory means, the stored information being read out of the memory means at the constant memory read transfer speed responsive to the read control signal, and wherein the memory write transfer speed is greater than the constant memory read transfer speed.

20. The information reading control apparatus as recited in claim 18 further comprising interface means for receiving the stored information from the memory means at the constant read transfer speed, and for transmitting the stored information to an external device.

21. An information reading control method of reading information recorded on a disk-shaped recording medium for an apparatus including a pickup means and a memory, the method comprising the steps of:
 a) rotating the disk-shaped recording medium at a constant angular velocity;
 b) reading, by the pickup means, the information from the disk-shaped recording medium;
 c) providing, by the pickup means, the information at an information transfer speed as the disk-shaped recording medium is rotated at the constant angular velocity, the information transfer speed changing in relation to a position of said pickup means relative to the disk-shaped recording medium;
 d) providing a clock signal from a variable frequency oscillator;
 e) storing, based on said clock signal, the information provided by the pickup means at a memory write transfer speed which varies and which corresponds to the information transfer speed at the position of the pickup means relative to the disk-shaped recording medium; and
 f) selecting from an external device one of a plurality of read transfer speeds for providing the stored information from the memory
 g) providing to said external device the stored information from the memory at said selected one of said plurality of read transfer speeds.

22. An information reading control apparatus according to claim 1, wherein said read control means reads out the information from the memory means by selecting a respective clock signal corresponding to any selected one of said plurality of rates.

* * * * *

UNITED STATES PATENT AND TRADEMARK OFFICE
CERTIFICATE OF CORRECTION

PATENT NO. : 5,808,995
DATED : September 15, 1998
INVENTOR(S) : Nakamura et al.

It is certified that error appears in the above-identified patent and that said Letters Patent is hereby corrected as shown below:

At column 12, claim 9, line 41, delete "mean" and insert --means--.

Signed and Sealed this

Sixteenth Day of March, 1999

Attest:

Q. TODD DICKINSON

Attesting Officer

Acting Commissioner of Patents and Trademarks